United States Patent
Kawada et al.

(10) Patent No.: US 9,077,047 B2
(45) Date of Patent: Jul. 7, 2015

(54) SECONDARY BATTERY AND METHOD OF MANUFACTURING THE SAME

(75) Inventors: Yoshitaka Kawada, Tokyo (JP);
Natsuki Toyota, Takasaki (JP); Naotada Okada, Yokohama (JP); Susumu Yahagi, Yokohama (JP)

(73) Assignee: Toshiba Corporation, Tokyo (JP)

( * ) Notice: Subject to any disclaimer, the term of this patent is extended or adjusted under 35 U.S.C. 154(b) by 30 days.

(21) Appl. No.: 13/356,357

(22) Filed: Jan. 23, 2012

(65) Prior Publication Data

US 2012/0189903 A1     Jul. 26, 2012

(30) Foreign Application Priority Data

Jan. 25, 2011  (JP) .................................. P2011-12675
Nov. 9, 2011  (JP) ................................ P2011-245192

(51) Int. Cl.
| | |
|---|---|
| *H01M 2/04* | (2006.01) |
| *H01M 10/058* | (2010.01) |
| *B23K 26/24* | (2014.01) |
| *B23K 26/36* | (2014.01) |
| *H01M 2/36* | (2006.01) |
| *H01M 2/02* | (2006.01) |
| *H01M 10/0525* | (2010.01) |

(52) U.S. Cl.
CPC .......... *H01M 10/058* (2013.01); *Y10T 29/4911* (2015.01); *Y10T 29/49108* (2015.01); *B23K 26/246* (2013.01); *B23K 26/36* (2013.01); *H01M 2/0217* (2013.01); *H01M 2/0426* (2013.01); *H01M 2/36* (2013.01); *H01M 2/365* (2013.01); *H01M 10/0525* (2013.01)

(58) Field of Classification Search
CPC ............ H01M 2/04; H01M 2/08; H01M 2/02
USPC ................................................... 429/163, 174
See application file for complete search history.

(56) References Cited

U.S. PATENT DOCUMENTS

| | | | |
|---|---|---|---|
| 2010/0291435 A1* | 11/2010 | Garin et al. ................... 429/180 |
| 2011/0039154 A1* | 2/2011 | Komatsuki et al. ........... 429/185 |
| 2011/0183196 A1* | 7/2011 | Suzuki et al. ................. 429/185 |

FOREIGN PATENT DOCUMENTS

| | | |
|---|---|---|
| CN | 101083310 A | 12/2007 |
| CN | 101911344 A | 12/2010 |
| JP | 2007018915 | 1/2007 |
| JP | 2007294308 | 8/2007 |

(Continued)

OTHER PUBLICATIONS

European Search Report Dated May 21, 2012.

(Continued)

*Primary Examiner* — Stewart Fraser
*Assistant Examiner* — Olatunji Godo
(74) *Attorney, Agent, or Firm* — Baker Botts L.L.P.

(57) ABSTRACT

A secondary battery according to an embodiment includes a container having a pouring hole through which an electrolyte is poured, and housing the electrolyte, poured through the pouring hole, together with an electrode body; and a sealing lid fixed to the container and closing the pouring hole. The container has a plurality of grooves extending in parallel along the outer edge of the pouring hole, in a predetermined region that surrounds the periphery of the pouring hole, and the sealing lid is provided on the plurality of grooves in such a manner as to close the pouring hole and is fixed to the container.

10 Claims, 5 Drawing Sheets

(56) References Cited

FOREIGN PATENT DOCUMENTS

| | | | |
|---|---|---|---|
| JP | 2008117605 | | 5/2008 |
| JP | 5045752 B2 | | 10/2012 |
| KR | 100824849 | | 4/2008 |
| WO | WO 2009128375 | * | 10/2009 |
| WO | 2010067450 | | 6/2010 |
| WO | WO 2010067450 | * | 6/2010 |
| WO | 2010119497 | | 10/2010 |

OTHER PUBLICATIONS

Chinese Office Action issued in related Chinese Patent Application No. 201210018897.1, mailed Dec. 4, 2013, 7 pages.

* cited by examiner

SECONDARY BATTERY AND METHOD OF MANUFACTURING THE SAME

This application is based on and claims the benefit of priority from Japanese Patent Applications No. 2011-12675, filed on Jan. 25, 2011 and No. 2011-245192, filed on Nov. 19, 2011; the entire contents of which are incorporated herein by reference.

FIELD

Embodiments herein relate to a secondary battery and a method of manufacturing a secondary battery.

BACKGROUND

In recent years, secondary batteries represented by a lithium ion battery have increasingly wide range of applications, mainly for in-vehicle use, and the production volume is constantly increasing. In the process of manufacturing a secondary battery, a method is often employed, in which the components of the battery are sealed in a metal case. In addition, in order to improve the space efficiency of the secondary battery, a rectangular cell case is often employed rather than a conventional circular case. In both cases where the circular cell case is employed and where the rectangular cell case is employed, laser welding, by which a structural body can be manufactured efficiently, is more often used for manufacturing lithium ion batteries.

In the manufacturing process of a lithium ion battery, laser welding is often used in the following three processes;

1. Cap seam welding for bonding an aluminum can body and a cap member.
2. Seal welding for closing a pouring hole for pouring an electrolyte.
3. Component welding for electrically connecting a plurality of cells in parallel or in series.

However, the seal welding of the second process among the above-mentioned processes is known to be technically difficult because the surroundings of the pouring hole, which tend to be easily contaminated with an electrolyte, need to be welded by a laser. When a metal lid for sealing is placed and welded on the pouring hole with some adhering electrolyte thereon, a weld defect occurs due to the influence an electrolyte or a solvent contained in the electrolyte. Even when welding is performed after removing the adhering electrolyte by suction or wiping, a bonding defect possibly due to the electrolyte will occur at a certain rate.

DETAILED DESCRIPTION

A secondary battery according to an embodiment includes a container having a pouring hole through which an electrolyte is poured, and housing the electrolyte, poured through the pouring hole, together with an electrode body; and a sealing lid fixed to the container and closing the pouring hole. The container has a plurality of grooves extending in parallel along the outer edge of the pouring hole, in a predetermined region that surrounds the periphery of the pouring hole, and the sealing lid is provided on the plurality of grooves in such a manner as to close the pouring hole while being fixed to the container.

According to another embodiment, a method of manufacturing a secondary battery includes: forming a plurality of grooves by laser irradiation in a predetermined region surrounding a periphery of a pouring hole of a container in which an electrolyte has been poured, the plurality of grooves extending in parallel along the outer edge of the pouring hole; placing a sealing lid on the formed plurality of grooves in such a manner as to close the pouring hole; and fixing the placed sealing lid to the container by laser welding.

Various Embodiments will be described hereinafter with reference to the accompanying drawings.

An embodiment is described with reference to the drawings.

Figure 1:
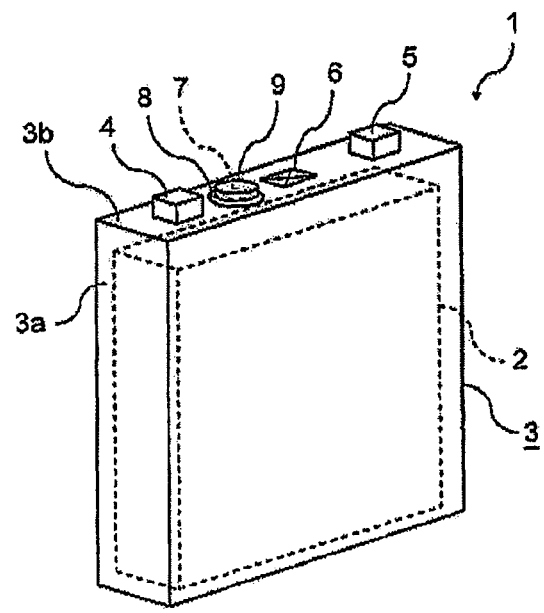
FIG. 1 is an external perspective view showing a schematic configuration of a secondary battery according to an embodiment.

As shown in FIG. 1, a secondary battery 1 according to the present embodiment includes an electrode body 2, a container 3 housing the electrode body 2 together with an electrolyte, and a pair of a positive electrode terminal 4 and a negative electrode terminal 5. The secondary battery 1 is, for example, a non-aqueous electrolyte secondary battery such as a lithium ion battery.

The electrode body 2 is formed by winding positive and negative electrode sheets as power generation elements in a spiral shape with a separator being interposed between the electrode sheets. The electrode body 2 is housed in the container 3 together with the electrolyte.

The container 3 is an outer container in a flat rectangular parallelepiped shape, and is formed of, for example, a metal such as aluminum or an aluminum alloy. The container 3 has a one-end-open container body 3a having an opening at the upper end (in FIG. 1), and a lid body 3b having a rectangular plate shape for closing the opening of the container body 3a, and is liquid-tightly formed with the lid body 3b being welded to the container body 3a.

The positive electrode terminal 4 is provided at one end of the lid body 3b in the longitudinal direction, and the negative electrode terminal 5 is provided at the other end. The positive electrode terminal 4 and the negative electrode terminal 5 are respectively connected to the positive electrode and the negative electrode of the electrode body 2, and project from the upper surface of the lid body 3b. In addition, either one of the terminals, for example, the positive electrode terminal 4 is electrically connected to the lid body 3b to have the same potential as that of the container 3. The negative electrode terminal 5 extends through the lid body 3b, and a seal member made of an insulating material such as a synthetic resin or glass, for example, a gasket (not shown) is provided between the negative electrode terminal 5 and the lid body 3b. The seal member hermetically seals between the negative electrode terminal 5 and the container 3, while electrically insulating the negative electrode terminal 5 from the container 3.

A safety valve 6 having, for example, a rectangular shape is provided in the center portion of the lid body 3b. The safety valve 6 is formed by thinning a portion of the lid body 3b to approximately half the thickness of the other portion of the lid body 3b, and a stamp is formed in the middle of the upper surface of the thinned portion. In the case where the internal pressure of the container 3 exceeds a predetermined value because of generation of gas inside the container 3 due to a failure or the like of the secondary battery 1, the safety valve 6 is opened to release the gas inside the container 3 and to thus reduce the internal pressure of the container 3, thereby preventing a failure such as an explosion of the secondary battery 1.

Furthermore, a pouring hole 7 through which the electrolyte is poured into the container 3 is formed in the lid body 3b. The pouring hole 7 is a through-hole, and is formed in, for example, a circular shape. The electrolyte is poured into the container 3 through the pouring hole 7.

Figure 2:
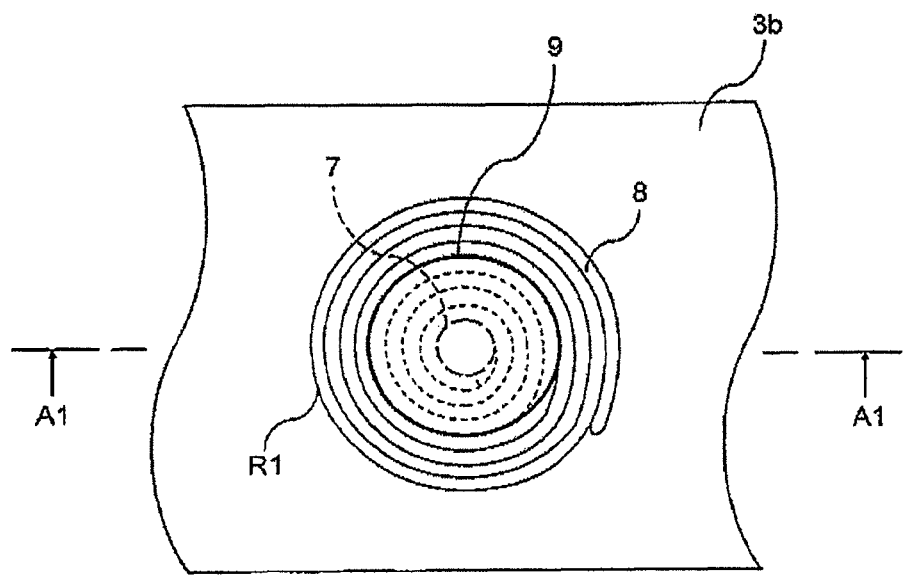
FIG. 2 is an enlarged plan view showing a periphery of a sealing lid of a container included in the secondary battery shown in FIG. 1.
Figure 3:
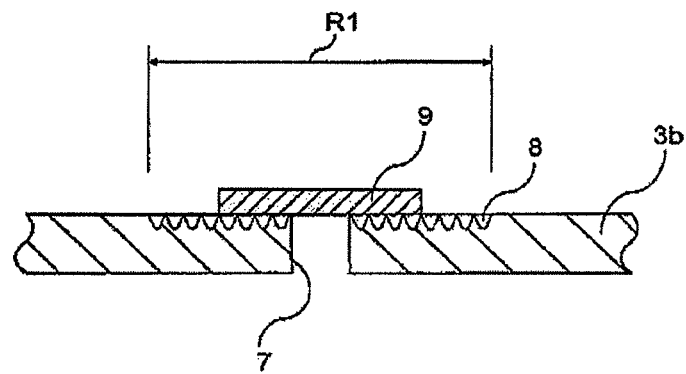
FIG. 3 is a cross-sectional view taken along a line Al-Al in FIG. 2.

As shown in FIGS. 2 and 3, a plurality of grooves 8 that extend in parallel along the outer edge of the pouring hole 7 are formed in the lid body 3b. The grooves 8 are formed in a predetermined region including the pouring hole 7 on the surface of the lid body 3b, i.e., a predetermined region R1 which surrounds the periphery of the pouring hole 7. The predetermined region R1 is, for example, a circular region concentric to the pouring hole 7, with a radius of several mm which is greater than that of a sealing lid 9. The grooves 8 are arranged in the direction of the normal to the outer edge of pouring hole 7, i.e., in the direction of the radius, between the outer edge of the pouring hole 7 and the outer edge of the predetermined region R1, and thus form a groove region. The grooves 8 are formed by a single groove existing in a spiral shape (helical shape), however, the formation of the grooves 8 is limited to this manner, and the grooves 8 may be formed by, for example, a plurality of grooves.

Figure 4:
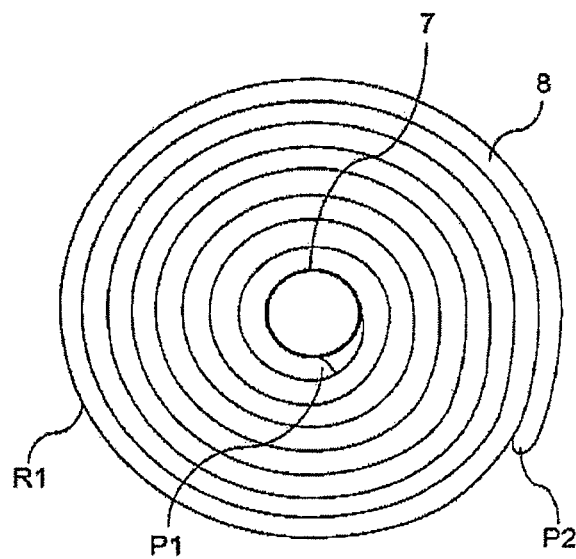
FIG. 4 is an explanatory view for explaining a starting end and a terminal end of a groove shown in FIGS. 2 and 3.

Here, the grooves 8 are formed by irradiating the predetermined region R1 on the lid body 3b surrounding the periphery of the pouring hole 7 with a laser beam in a spiral pattern, and thus are formed of a single groove in a spiral shape. In this step, a laser beam having a sufficient output to melt the metal is irradiated. As shown in FIG. 4, a starting point P1 of the laser irradiation is located adjacent to the outer edge of the pouring hole 7, and the laser beam irradiation is performed from the inside to the outside in a spiral pattern, and thus a terminal point P2 of the laser irradiation is located on the outer edge of the predetermined region R1. At first, the starting end of the groove 8 corresponding to the starting point P1 of the laser irradiation has a semicircular arc shape. However, when another groove 8 which is adjacent to the starting point P1 is formed, the other groove 8 overlaps with the starting point P1, and thus the original semicircular arc shape is deformed to be an arc shape which is shorter than the semicircular arc. On the other hand, the terminal end of the grooves 8 corresponding to the terminal point P2 of the laser irradiation is located on the outermost circumference, and thus has a semicircular arc shape unlike the starting end.

The sealing lid 9 that closes the pouring hole 7 is fixed to the lid body 3b by laser welding. The sealing lid 9 which is formed of, for example, a metal such as aluminum or an aluminum alloy is provided on the relevant grooves 8 in such a manner as to close the pouring hole 7, and is fixed to the lid body 3b. The sealing lid 9 is formed, for example, in a circular shape with its radius being greater than the radius of the pouring hole 7 and being less than the radius of the predetermined region R1.

Next, a manufacturing process (manufacturing method) for the above-mentioned secondary battery 1 is described.

Figure 5:
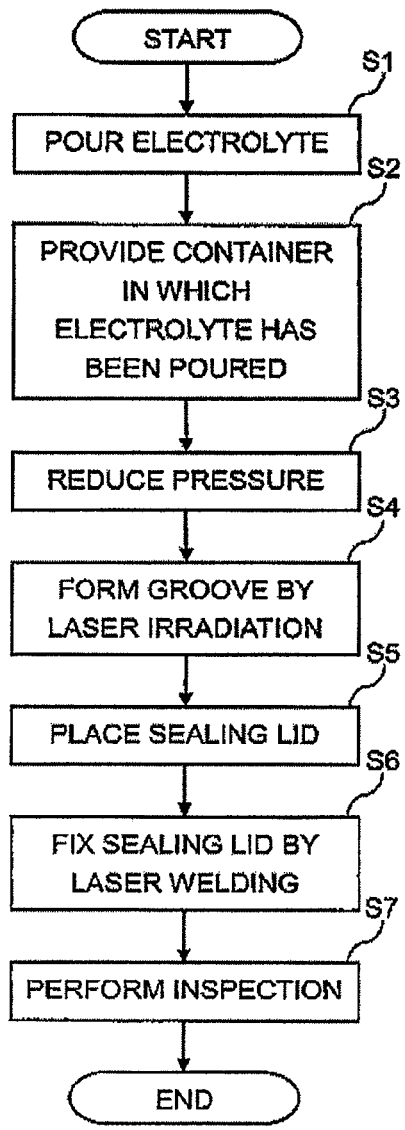
FIG. 5 is a flowchart showing the flow of a manufacturing process for manufacturing the secondary battery shown in FIG. 1.

As shown in FIG. 5, at first, an electrolyte is poured through the pouring hole 7 into the container 3 using an electrolyte pouring device (Step S1). Subsequently, the container 3 in which the electrolyte has been poured is provided to a laser irradiation device (Step S2).

Next, the ambient atmosphere of the container 3 in which the electrolyte has been poured is put in a reduced pressure state (Step S3). Note that, the entire container 3 or only the upper portion thereof where the sealing lid 9 is located is enclosed in an enclosed space, i.e., is enclosed in a chamber of the laser irradiation device. The atmosphere of the enclosed space within the chamber is reduced in pressure to, for example, 20 kPa in $N_2$ atmosphere.

After the pressure reduction in Step S3, the surrounding periphery (the above-described predetermined region R1) of the pouring hole 7 on the container 3 is irradiated with a laser beam using the laser irradiation device, so that each groove 8 is formed in the predetermined region R1 on the lid body 3b of the container 3 (Step S4).

Figure 6:
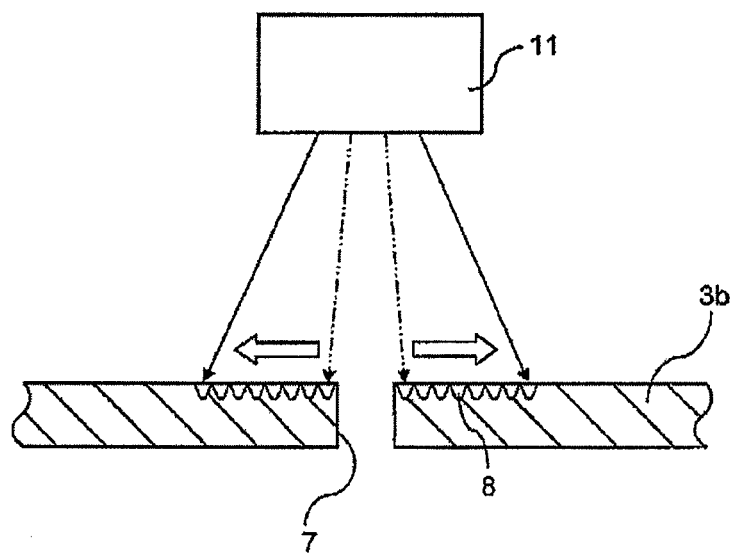
FIG. 6 is an explanatory view for explaining laser irradiation in the manufacturing process shown in FIG. 5.

In this step, as shown in FIG. 6, the predetermined region R1 on the lid body 3b is irradiated from the inside to the outside in a spiral pattern with a laser beam having a sufficient output to melt the metal using a laser irradiation unit 11 of the laser irradiation device. Thus, a single groove in a spiral shape is formed, and consequently, the plurality of grooves 8 that extend in parallel along the outer edge of the pouring hole 7 are formed. At the same time, because of the heat generated as the metal is melted by a laser beam, the electrolyte adhering to the periphery of the pouring hole 7 is vaporized and removed. In the case where the adhering electrolyte is not removed and the sealing lid 9 is welded to the lid body 3b using a laser in a subsequent process, a weld defect such as a defective hole frequently occurs.

Note that the laser irradiation device extracts an image of the pouring hole 7 from data of a captured image of a periphery (a region including the predetermined region R1) of the pouring hole 7, in advance, and performs image processing on the extracted image of the pouring hole 7 to identify the coordinates of the pouring hole 7. Then, the laser irradiation device focuses a laser beam having a sufficient output to melt the metal, and then scans and irradiates the periphery of the pouring hole 7 in a spiral pattern with the laser beam, while correcting the laser irradiation position based on the identified coordinates.

As the laser beam scanning method, a scanning method using a scanner such as a galvano scanner is preferable because high-speed laser beam scanning is possible with the method. However, a method of rotating the work body of the container 3, or a method of moving an optical system using a moving mechanism such as a robot may be used.

Note that overflowed electrolyte in the periphery of the pouring hole 7 of the container 3 may be absorbed by an absorber before the grooves 8 are formed. In this case, the electrolyte adhering to the periphery of the pouring hole 7 can be securely removed. In the case where the upper end of the through pouring hole 7 is formed in a tapered shape, the grooves 8 may be formed starting from the tapered upper end.

Next, after the formation of the grooves 8 in Step S4, the sealing lid 9 is placed on the relevant grooves 8 of the lid body 3b of the container 3 in such a manner as to close the pouring hole 7 by a mounting device such as a robot (Step S5). In the above-mentioned reduced pressure state, the sealing lid 9 is fixed to the lid body 3b of the container 3 by laser welding (Step S6). Finally, a predetermined inspection such as a shipment test is performed (Step S7).

In the laser welding, the laser irradiation device uses the laser irradiation unit 11 to irradiate the surface area of the sealing lid 9 above the lid body 3b in a ring pattern with a laser beam having a sufficient output to melt the metal, higher than the laser output used for the above-described formation of the grooves 8 (for example, about twice as much as the laser output used for the formation of the grooves 8). Consequently, the outer edge of the pouring hole 7 is irradiated with a laser beam in a ring pattern, and thus the sealing lid 9 is welded to the lid body 3b.

Figure 7:
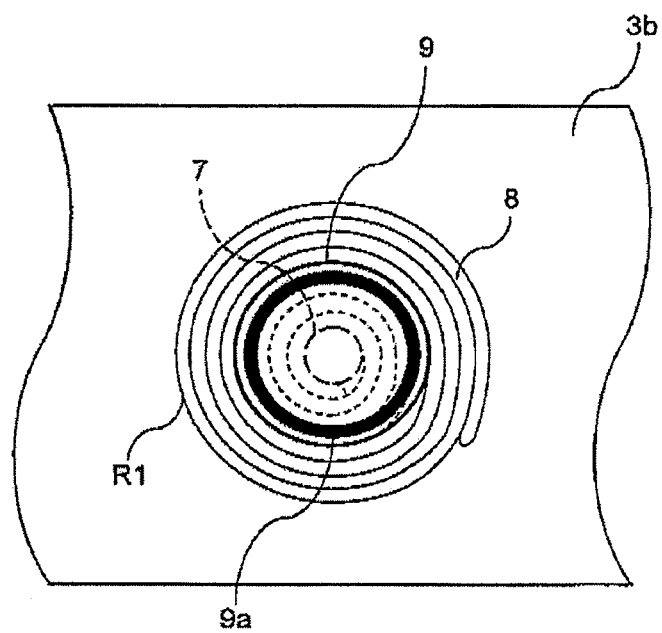
FIG. 7 is a plan view depicting a welding mark on the sealing lid shown in FIG. 2.

By the laser welding, as shown in FIG. 7, a welding mark (welding spot) 9a where the sealing lid 9 and the lid body 3b are fixed exists in a ring shape inside the outermost edge of the plurality of grooves 8 (the outer edge of the predetermined region R1), i.e., at the pouring hole 7 side of the grooves 8. At this time, the sealing lid 9 is disposed such that the entire outer edge of the sealing lid 9 is located inside the outermost edge of the plurality of grooves 8 (the outer edge of the predetermined region R1), i.e., at the pouring hole 7 side of the grooves 8.

Note that, similarly to the above-described formation of the grooves 8, in the above welding of the sealing lid 9, the entire container 3 or only the upper portion thereof is made an enclosed space and the atmosphere in the enclosed space is reduced in pressure when the sealing lid 9 is welded. In the case where the relevant exhaust velocity is high or the ultimate vacuum is high, a large quantity of electrolyte will leak out from the pouring hole 7, and thus it is essential to control reduced atmosphere in a range of 10 kPa to 30 kPa. For example, the exhaust system is controlled with a pressure of 20 kPa as a targeted value.

Subsequently, the sealing lid 9 is scanned with a laser beam in a ring pattern in a reduced-pressure atmosphere and is welded as described above. Similarly to the above-described formation of the grooves 8, as a laser beam scanning method, a method using a scanner such as a galvano scanner is preferable because high-speed laser beam scanning is possible with the method. However, depending on the scanning speed, a method of rotating the work body of the container 3, or a method of moving an optical system using a moving mechanism such as a robot may be used.

Figure 8:
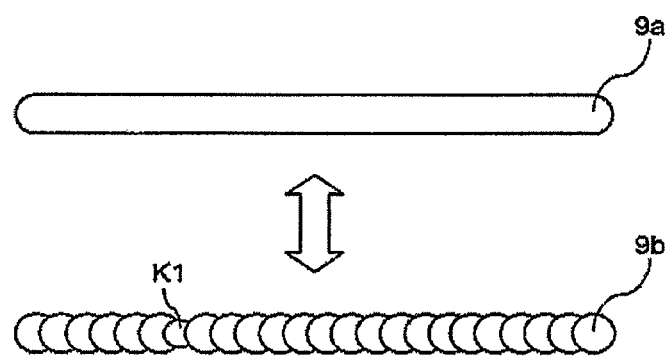
FIG. 8 is an explanatory view for explaining a welding mark formed by CW laser beam irradiation, and a welding mark formed by pulse laser beam irradiation.

Here, the case where a continuous wave laser (CW laser) is used as the aforementioned laser beam, and the case where a pulse laser beam is used as the aforementioned laser beam are described with reference to FIG. 8. In FIG. 8, the welding mark 9a formed by CW laser beam irradiation is shown on the upper side, and a welding mark 9b formed by pulse laser beam irradiation is shown on the lower side. Note that the CW laser beam is a temporally continuous laser beam, and the aforementioned pulse laser beam is a temporally discontinuous laser beam.

As shown in FIG. 8, the welding mark 9a formed by CW laser beam irradiation is a single continuous line, but the welding mark 9b formed by pulse laser beam irradiation includes a weld defect K1. In the welding by a pulse laser, because the pulse energy is temporally discontinuous, the melting time is short, and when a laser pulse with weak laser energy is radiated even once, the welding mark (welding beads) 9b is significantly affected by the laser pulse. Consequently, the weld defect K1 tends to occur.

On the other hand, in the welding by a CW laser, the melting time of metal is relatively long, and a metal molten pool continuously moves, and thus the welding mark 9a as a processing mark is not significantly affected even the power varies somewhat. In addition, even when the absorption rate of the laser beam varies in accordance with the surface conditions of the metal as a welding target, the welding mark 9a is not affected much for the same reason as described above. Therefore, even with a disturbance factor, when a CW laser is used for welding, irregularity in the welding mark 9a is little, and thus extremely stable welded joint may be obtained. Note that also for the formation of the grooves 8, a CW laser is preferably used as described above.

In addition, because the pulse laser has a relatively high peak power and thus is widely used for welding process, however, in the welding by a pulse laser, the melting time of metal as a processing object is short, the molten mark becomes discontinuous (what is called a patchwork mark). Therefore, a weld defect such as a splash or a blow hole tends to occur, and the reliability as a joint is significantly low. Consequently, in many cases, a welded joint by a pulse laser cannot be used for vehicle mount application, which requires high welding quality.

In addition, laser welding by a pulse laser has another problem, that is, low productivity. Specifically, the welding speed can be improved up to only several tens mm/s at the maximum, and the throughput is low, and thus it is difficult to improve productivity. On the other hand, by using a CW laser beam for welding, specifically using a solid state laser such as a fiber laser or a disk laser, which is capable of oscillating with continuous output power in the order of several kW, reliability and productivity of the welding can be improved.

As described above, according to the present embodiment, the plurality of grooves 8 extending in parallel along the outer edge of the pouring hole 7 of the container 3 in which an electrolyte has been poured are formed by irradiating the predetermined region R1 surrounding the periphery of the pouring hole 7 with a laser; the sealing lid 9 is placed on the formed grooves 8 in such a manner as to close the pouring hole 7; and the placed sealing lid 8 is fixed to the container 3 by laser welding, and thus any electrolyte remaining in the periphery of the pouring hole 7 is removed because of the heat generated by the laser irradiation as the grooves 8 are formed, and the sealing lid 9 is welded to the container 3 after the removal of the electrolyte. Consequently, a defect occurrence due to the electrolyte remaining in the vicinity of the pouring hole 7 is prevented, and quality of the seal welding of the pouring hole 7 is improved, and thus high quality and high reliability of the secondary battery 1 may be achieved. In addition, the secondary battery 1 can be manufactured with a high yield.

Furthermore, the electrolyte remaining in the periphery of the pouring hole 7 enters the grooves 8, and thus spreading of the remaining electrolyte over a wide area is prevented, and the influence of the remaining electrolyte on the subsequent process of the laser welding may be reduced. Therefore, a defect occurrence due to the remaining electrolyte in the vicinity of the pouring hole 7 is securely prevented, and thus quality of the seal welding for the pouring hole 7 can be further improved.

In addition, the plurality of grooves 8 are formed by irradiating the predetermined region R1 in the periphery of the pouring hole 7 with a laser beam in a helical pattern along the outer edge of the pouring hole 7, and thus each groove 8 extending in parallel along with the outer edge of the pouring hole 7 can be formed in a short time. Thus, the manufacturing time of the secondary battery 1 may be reduced.

In addition, the grooves 8 are successively formed from the inside to the outside with the pouring hole 7 as the center, therefore, compared with successive forming of the grooves from the outside to the inside, the remaining electrolyte may be securely removed from the periphery of the pouring hole 7.

Consequently, a defect occurrence due to the remaining electrolyte in the vicinity of the pouring hole 7 is more securely prevented.

When the predetermined region R1 is irradiated with a laser beam from the inside to the outside, a phenomenon occurs in which the electrolyte remaining in the periphery of the pouring hole 7 moves from the inside to the outside, and thus moves to the outside region of the predetermined region R1, i.e., the region that is not involved in the laser welding of the sealing lid 9 to the container 3. On the other hand, when the predetermined region R1 is irradiated with a laser beam from the outside to the inside, a phenomenon occurs in which the electrolyte remaining in the periphery of the pouring hole 7 moves from the outside to the inside, and thus moves to the region that is involved in the laser welding of the sealing lid 9 to the container 3, i.e., the vicinity of the pouring hole 7, and gathers into large drops, thereby making it difficult for a laser beam to operate consequently, by the laser beam irradiation from the inside to the outside, the remaining electrolyte may be more securely removed from the periphery of the pouring hole 7, and thus a defect occurrence due to the remaining electrolyte in the vicinity of the pouring hole 7 is more securely prevented.

Note that, although the electrolyte is forced to move from the inside to the outside by the laser beam irradiation, some of the electrolyte may remain (for example, some of the electrolyte may return along the grooves 8 in a helical shape). Now, after the electrolyte is forced to move to the outside of the predetermined region R1 completely, welding is performed inside the outermost edge of the plurality of grooves 8 (the outer edge of the predetermined region R1), and thus the frequency of occurrence of a weld failure may be further reduced. Some of the remaining electrolyte returns inwards by capillary action when the sealing lid 9 is placed on the relevant grooves 8 of the lid body 3b, however, a plurality of walls (walls formed by the grooves 8) are present in the radial direction and the electrolyte is absorbed by the grooves in the circumferential direction, and thus hardly reach the innermost of the grooves.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
a container having a pouring hole through which an electrolyte is poured, and housing the electrolyte, poured through the pouring hole, together with an electrode body; and
a sealing lid fixed to the container and closing the pouring hole,
wherein the container has a plurality of grooves being parallel to an outer edge of the pouring hole, in a predetermined region that surrounds a periphery of the pouring hole,
the grooves are formed such that each upper part between the grooves in a section perpendicular to the direction in which the grooves extend is sharp,
the sealing lid is provided on upper parts between the grooves, and
an under surface of the sealing lid is welded to one of the upper parts between the grooves.

2. The secondary battery according to claim 1,
wherein the plurality of grooves are connected and turn into one groove formed in a spiral shape.

3. The secondary battery according to claim 1,
wherein the plurality of grooves are formed such that an upper part between an innermost groove of the grooves and the pouring hole in a section perpendicular to the direction in which the grooves extend is sharp.

4. The secondary batter according to claim 1,
wherein the under surface of the sealing lid is welded to one top of the upper parts.

5. The secondary battery according to claim 4,
wherein the sealing lid has a welding mark where the sealing lid and the container are fixed, and
the welding mark is located right above the one top of the upper parts.

6. The secondary batter according to claim 1,
wherein the whole under surface of the sealing lid is flat and each top of the upper parts in the same height.

7. The secondary battery according to claim 2,
wherein the whole under surface of the sealing lid is flat and each top of the upper parts is the same height.

8. The secondary battery according to claim 3,
wherein
the whole under surface of the sealing lid is flat and each top of the upper parts is the same height.

9. The secondary battery according to claim 4,
wherein
the whole under surface of the sealing lid is flat and each top of the upper parts is the same height.

10. The secondary battery according to claim 5,
wherein the whole under surface of the sealing lid is flat and each top of the upper parts is the same height.

* * * * *